United States Patent
Raffa et al.

(10) Patent No.: US 9,489,772 B2
(45) Date of Patent: Nov. 8, 2016

(54) ENVIRONMENT ACTUATION BY ONE OR MORE AUGMENTED REALITY ELEMENTS

(71) Applicant: Intel Corporation, Santa Clara, CA (US)

(72) Inventors: Giuseppe Raffa, Portland, OR (US); Glen J. Anderson, Beaverton, OR (US); Lama Nachman, San Francisco, CA (US); Yi Wu, San Jose, CA (US); Rahul C. Shah, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 13/851,394

(22) Filed: Mar. 27, 2013

(65) Prior Publication Data

US 2014/0292807 A1    Oct. 2, 2014

(51) Int. Cl.
*G06T 19/00*        (2011.01)

(52) U.S. Cl.
CPC ... *G06T 19/006* (2013.01); *G05B 2219/32014* (2013.01)

(58) Field of Classification Search
CPC .... A63F 13/00; A63F 2300/69; A63F 13/12; A63F 2300/105; A63F 2300/204; A63F 2300/6676; A63F 13/10; A63F 2300/1093; A63F 2300/406; A63F 2300/1087; A63F 2300/04
See application file for complete search history.

(56) References Cited

U.S. PATENT DOCUMENTS

| | | | |
|---|---|---|---|
| 2003/0007648 A1* | 1/2003 | Currell | 381/61 |
| 2006/0038833 A1 | 2/2006 | Mallinson et al. | |
| 2008/0231611 A1* | 9/2008 | Bathiche et al. | 345/175 |
| 2009/0244097 A1 | 10/2009 | Estevez | |
| 2010/0257252 A1 | 10/2010 | Dougherty et al. | |
| 2011/0107216 A1 | 5/2011 | Bi | |
| 2011/0242134 A1 | 10/2011 | Miller et al. | |
| 2012/0058801 A1 | 3/2012 | Nurmi | |
| 2012/0306850 A1* | 12/2012 | Balan et al. | 345/419 |
| 2014/0092005 A1 | 4/2014 | Anderson et al. | |
| 2014/0152558 A1* | 6/2014 | Salter et al. | 345/157 |
| 2014/0280278 A1* | 9/2014 | Harris | G06F 17/30861 707/758 |

FOREIGN PATENT DOCUMENTS

| | | |
|---|---|---|
| EP | 2 400 464 A2 | 12/2011 |
| WO | 2014/160776 A1 | 10/2014 |

OTHER PUBLICATIONS

Barakonyi et al., Augmented Reality Agents in the Development Pipeline of Computer Entertainment, Entertainment Computing—ICEC 2005, Proceedings 4th International Conference, Sanda, Japan, Sep. 19-21, 2005, pp. 345-356.*

International Search Report and Written Opinion received for PCT Patent Application No. PCT/US2014/031862, mailed on Jul. 31, 2014, 14 pages.

* cited by examiner

Primary Examiner — Maurice L McDowell, Jr.
Assistant Examiner — Donna J Ricks
(74) *Attorney, Agent, or Firm* — Jordan IP Law, LLC

(57) ABSTRACT

Apparatuses, systems, media and methods may provide for environment actuation by one or more augmented reality elements. A location module may determine a location of one or more networked devices in a real space and/or establish a location of the one or more augmented reality elements in a virtual space, which may be mapped to the real space. A coordinator module may coordinate a virtual action in the virtual space of the one or more augmented reality elements with an actuation event by the one or more networked devices in the real space. The actuation event may correspond to the virtual action in the virtual space and be discernible in the real space.

29 Claims, 4 Drawing Sheets

ENVIRONMENT ACTUATION BY ONE OR MORE AUGMENTED REALITY ELEMENTS

BACKGROUND

In AR implementations, a user may observe the actions of an AR element in a real space (e.g., environment) only when the user is viewing a rendering of the element and/or via an intermediate device. For example, the user may need an intermediate display device (e.g., tablet) to observe the result of an interaction between the AR element and the real objects in the real space. Such implementations may lead to unnecessary utilization of resources such as a device, processor, memory, and power (e.g., reduced battery life). In addition, such implementations may be constrained to a particular device where the AR element is computed and/or displayed.

BRIEF DESCRIPTION OF THE DRAWINGS

The various advantages of embodiments will become apparent to one skilled in the art by reading the following specification and appended claims, and by referencing the following drawings, in which:

DETAILED DESCRIPTION

Figure 1:
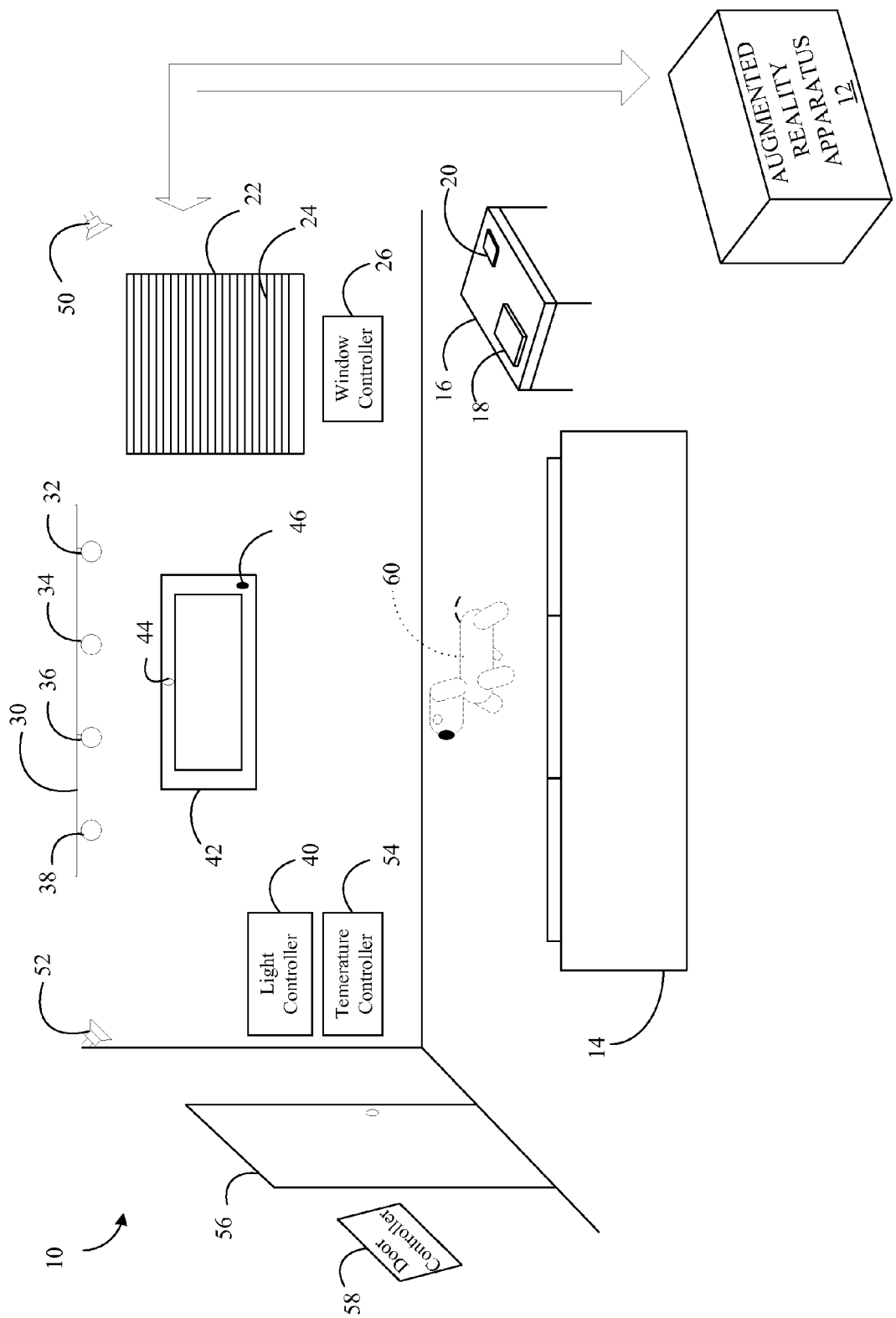
FIG. 1 is a block diagram of an approach to coordinate a virtual action of one or more augmented reality elements in a real space with an actuation event by one or more networked devices in the real space according to an embodiment.

FIG. 1 shows an approach to coordinate a virtual action of one or more augmented reality (AR) elements with one or more actuation events by one or more networked devices in a real space according to an embodiment. The AR element may include a character. In one example, the character may include a caricature, an animated representation of an inanimate object, and so on, and combinations thereof. In another example, the AR element may include an AR scene. For example, the AR scene may include two or more AR elements interacting to form an AR illustration. In a further example, the AR element may include an AR effect for the AR element. For example, the AR effect may include shaking, turbulent flow, spinning, shivering, and so on, and combinations thereof. The AR element may include a virtual pet in one aspect of embodiments.

The AR element may reside in a virtual space that may be mapped and/or associated with a real space. For example, the virtual space may be mapped in a 1:1 manner with the real space. In one example, the 1:1 mapping may include a 1:1 coordinate mapping between the virtual space and the real space (e.g., one coordinate position in the virtual space to one coordinate position in the real space), a 1:1 landmark mapping between the virtual space and the real space (e.g., one virtual object in the virtual space to one real object in the real space), and so on, or combinations thereof. The coordinate position may include any coordinate, for example a Cartesian coordinate (e.g., x, y 2D coordinate, x, y, z 3D coordinate, etc.). While the mapping may include a map for the entire real space, the map for entire real space may not be implemented (e.g., automatically selected to an area of a home where a user is located, user-defined via a user interface, and so on, or combinations thereof).

In the illustrated example, one or more real objects in a real space 10 may be communicatively connected with each other and/or with an AR apparatus 12. The illustrated AR apparatus 12 may include any computing device and/or data platform such as a laptop, personal digital assistant (PDA), wireless smart phone, media content player, imaging device, mobile Internet device (MID), any smart device such as a smart phone, smart tablet, smart TV, computer server, and so on, or any combination thereof. The AR apparatus 12 may include one or more logic components residing in the real space 10, in a remote location relative to the real space 10, and so on, or combinations thereof.

In the illustrated example, the real space 10 may include a living space (e.g., home) of a user. As such, the real space 10 may include real objects (e.g. furniture) such as a couch 14, a table 16, and so on, or combinations thereof. The real space 10 may also include real objects (e.g., consumer electronics) such as a tablet 18, a smartphone 20, a TV 42 having a front-facing camera 44 and an internal speaker 46, overhead speakers 50, 52, and so on, or combinations thereof. The illustrated real space 10 may also include one or more fixtures. For example, a mini-blind 24 may cover a window 22, a light fixture 30 having lights 32, 34, 36, 38 may be secured over the TV 42, and a door 56 may separate the illustrated room from other parts of the real space 10, such as a kitchen, a bedroom, a porch, and so on. While not shown, it should be understood that one or more appliances may also reside in the real space 10, including generic connected appliances. For example, the kitchen of the real space 10 may include one or more appliances such as a refrigerator, microwave, stove, oven, coffee maker, and so on, or combinations thereof. In another example, a laundry room of the real space 10 may include a washer, dryer, and so on, or combinations thereof.

In addition, the real space 10 may include one or more controllers to enable the operation and/or control of one or more real objects in the real space 10. In the illustrated example, a window controller 26 may control the window 22 and/or the mini-blind 24. For example, the mini-blind 24 may be controlled through the window controller 26 to open or shut using a timer, user input, and so on, or combinations thereof. The window controller 26 may be operated by employing a keypad on the controller itself, wirelessly via a remote, and so on, or combinations thereof. Similarly, the light fixture 30 may be controlled by a light controller 40 and/or the door 56 may be controlled by a door controller 58, each of which may be operated using a keypad, a remote, and so on, or combinations thereof. Additional controllers may also be employed to control one or more assemblies of the real space 10. For example, a heating, ventilation and air-conditioning (HVAC) assembly of the real space 10 may be controlled by a temperature controller 54. In addition, a controller may be employed to control the TV 42, the speakers 50, 52, and so on, or combinations thereof.

It should be understood that any controller may alternatively, or additionally, operate as a sensor. For example, the temperature controller 54 may include a thermostat, which may read the temperature of the real space 10 as well as actuate the HVAC assembly to achieve a suitable environmental condition. In addition, while external controllers have been shown for the purpose of illustration, it should be understood that any real object and/or assembly in the real space 10 may be controlled via internal control mechanisms. For example, a refrigerator (not shown) residing in the kitchen of the real space 10 may be addressable, connected via a communications network, and remotely controlled through the network using a control signal directed to the appliance's internal control circuitry.

Accordingly, one or more real objects and/or assemblies in the real space 10 may be communicatively connected via a communication network to each other and/or to the AR apparatus 12. For example, two or more real objects in the real space 10 may be connected to communicate over existing electrical wiring in the home via an X-10 schema. In the X-10 schema, a transmitter may plug (or wire) in at one location in the home and send a control signal (on, off, dim, bright, etc.) to a receiver that may plug (or wire) into another location in the home. In addition, any other communication schema may be employed to interconnect real objects and/or assemblies residing in the real space 10, such as Universal Powerline Bus (UPB), Z-Wave, ZigBee, Bluetooth, WiFi, and so on, or combinations thereof.

The illustrated AR apparatus 12 may include a network interface (not shown) to communicatively connect to one or more real objects (and/or assemblies) residing in the real space 10. The network interface may provide a wide variety of communication functionality in addition to the aforementioned communication schemas, such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning Systems (GPS), spread spectrum (e.g., 900 MHz), and other radio frequency (RF) telephony purposes. In the illustrated example, the network interface of the AR apparatus 12 may be employed to connect with each addressable real object in the real space 10 to enable the AR apparatus 12 to receive data from each of the real objects and send data to each of the real objects in the real space 10.

In the illustrated example, the AR apparatus 12 may also include a location module to determine via information received from the network interface a location of the networked devices in the real space 10. For example, the location module of the AR apparatus 12 may receive location information (e.g., via the network interface) from the networked real objects in the real space 10, which may actively report their location to the AR apparatus 12. The location information may be actively reported based on any criteria, such as if the real object has the potential of interacting with an AR element, if the user wishes to report the location of that real object, after a predetermined amount of time, on occurrence of an event (e.g., power up, addressing, connection, etc.) and so on, or combinations thereof. In addition, the location module may determine the location information using a network mapping protocol, for example Simple Network Management Protocol (SNMP) for managing devices on IP networks.

The location of the networked devices may also be determined using one or more sensors, such as a motion sensor, an audio sensor, an image sensor, an environmental sensor, and so on, or combinations thereof. For example, the location module of the AR apparatus 12 may generate a three-dimensional (3D) model of the real space 10 to determine the location of all of the real objects in the real space 10, whether connected to a network (and/or schema) or not. In one example, simultaneous localization and mapping (SLAM) processes may be employed to determine the location of all of the real objects in the real space 10, wherein one or more sensors may be employed (e.g., image sensors such as 1D single beam, 2D laser rangefinders, 2D cameras, 2D or 3D sound navigation and ranging (SONAR) sensors, 3D light detection and ranging (LIDAR) sensors, real-time locating systems (RTLS) sensors, etc.) to generate a model and respective representation. In one example, RTLS may include one or more of active radio frequency identification (Active RFID), active radio frequency identification-infrared hybrid (Active RFID-IR), infrared (IR), optical locating, low-frequency signpost identification, semi-active radio frequency identification (semi-active RFID), radio beacon, ultrasound identification (US-ID), ultrasonic ranging (US-RTLS), ultra-wideband (UWB), wide-over-narrow band, wireless local area network (WLAN, Wi-Fi), Bluetooth, clustering in noisy ambience, bivalent systems, and so on, or combinations thereof. Also, the user may manually assign 3D locations to one or more objects and appliances in a set-up process, such as a one-time setup procedure.

The location module of the AR apparatus 12 may also establish a location of one or more AR elements in a virtual space. For example, the location module of the AR apparatus 12 may receive the location of a networked device in the real space 10 and establish that the AR element is to be virtually located proximate that networked device (e.g., establish the location of the AR element in a virtual space that may be mapped to the real space). In one example, the location of the AR element may be automatically assigned by the location module of the AR apparatus 12 based on predetermined criteria, such as time of day, availability of devices in the real space 10, type of user in the real space 10, location of the user in the real space 10, affiliation of the AR element, user command information, and so on, or combinations thereof. In addition, the location of the AR element may depend on one or more attributes of the AR element, such as the manner of locomotion of the AR element, type of the AR element, age of the AR element, training of the AR element, and so on, or combinations thereof. The user may also select a starting position for the AR element in real-time (e.g., via a user interface, database, etc.), and the location module of the AR apparatus 12 may track the virtual behavior (e.g., virtual movement) of the AR element based on the predetermined criteria, the attributes of the AR element, and so on, or combinations thereof. The location of the networked devices, objects, AR elements and/or users may be stored by the location module in a database and/or map, retrieved from a database and/or map by the location module, and so on, or combinations thereof.

In the illustrated example, the AR apparatus 12 may also include a coordinator module to coordinate a virtual action of one or more AR elements 60 in the virtual space with an actuation event by the one or more networked devices in the real space. For example, the coordinator module of the AR apparatus 12 may receive information from the door controller 58 that the door 56 has been manually actuated, indicating that there may be a user in the real space 10. The coordinator module of the AR apparatus 12 may include and/or interact with the location module of the AR apparatus 12 to determine that the AR element 60 is not yet in the room and to establish that the virtual location of the AR element 60 in the virtual space is to correspond to the entrance of the real space 10 proximate the speaker 50. The location module of the AR apparatus 12 may also request an update for location information of all of the real objects in the real space 10, may automatically receive the location information, and/or may retrieve the information from a database stored in memory, which may be employed by coordinator module of the AR apparatus 12 to coordinate the virtual action of the AR element 60 in the virtual space with the actuation event by the networked devices in the real space 10.

In one example, the front-facing camera 44 of the TV 42 may be used to indicate that the user is lying down on the couch 14 and watching a program on the TV 42. The coordinator module of the AR apparatus 12 may send a control signal to the speaker 50 to actuate the speaker 50 by causing a rendering of audio representative of the virtual behavior of the AR element 60 (e.g., steps representative with a dog walking into the room). Next, the coordinator module of the AR apparatus 12 may send a control signal to actuate the smartphone 20 by causing a rendering of audio and/or video of the AR element 60. As the AR element 60 virtually walks in the virtual space past a virtual location corresponding to the smartphone 20, the AR element 60 may be displayed in a display of the smartphone 20 via a control signal by the control module thereto. In addition, the controller module of the AR apparatus 12 may send a control signal to the window controller 26 to actuate the mini-blind 24 by causing it to move.

In addition, the coordinator module of the AR apparatus 12 may send a control signal to actuate the tablet 18 by causing a rendering of audio and/or video of the AR element 60 approximately half the virtual distance travelled by the AR element 60 in the virtual space relative to the width of the window 22. As the AR element 60 virtually walks in the virtual space past a virtual location corresponding to the tablet 18, the controller module of the AR apparatus 12 may send a control signal to the light controller 40 to actuate the light fixture 30 by causing the lights 32, 34, 36, and 38 to turn on in sequence as the AR elements 60 virtually walks in the virtual space across a virtual location corresponding to the light fixture 30. In addition, the coordinator module of the AR apparatus 12 may send a control signal to actuate the TV 42 by causing a rendering of audio and/or video of the AR element 60 between the lights 32 and 38 as the AR element 60 virtually walks across the room. The coordinator module of the AR apparatus 12 may send control signals to actuate the speaker 52, the temperature controller 54, and/or the door controller 58 to represent a virtual action of the AR element 60. The AR element 60 may also virtually sit, lay down, walk in a predetermined or random pattern about the virtual space (and therefore about the associated real space 10), and so on, or combinations thereof.

In the illustrated example, the actuation event may correspond to the virtual action and/or be discernible in the real space 10. For example, the actuation event of the light 32 (e.g., powering on) may correspond to the virtual action in a virtual space of the AR element 60 virtually walking past a virtual location corresponding to the light 32. In addition, the virtual action and/or the actuation event may occur regardless of, irrespective of, and/or in no way dependent of a display (e.g., image rendering, video rendering, and/or projection rendering, etc.) of the AR element 60. In one example, the virtual action may define a change in the virtual location of the AR element 60 between the light 32 and the light 38 (e.g., a virtual walk associated with the real space 10 in a direction from the light 32 to the light 38), which may occur regardless of whether the TV 42 is off or on to render an image of the AR element 60, regardless of an instruction to turn the TV 42 off or on, regardless of an instruction to block the display or to allow the display the AR element 60 by the TV 42, and so on, or combinations thereof.

In another example, the virtual action may define that the AR element 60 is to virtually walk to a virtual location corresponding to the corner of illustrated room and virtually sit. Although a display device (e.g., the tablet 18) may be employed to observe the entire virtual action as it occurs (e.g., the virtual walk and sit), the display of the AR element 60 by the tablet 18 may not be necessarily required for the virtual action to occur. For example, the tablet 18 may be turned on and pointed toward the corner of the room near the end of the virtual action to observe the AR element 60 (which has virtually walked to the corner) as it virtually arrives to the corner and begins to virtually sit, as it virtually sits, and so on, or combinations thereof. Accordingly, at least a portion of the virtual action may occur regardless of whether the AR element 60 is displayed.

In a further example, the virtual action may include peering into a target display device (e.g., the TV 42) by the AR element 60. For example, the head of the AR element 60 may briefly appear in the display of the display device. The virtual action may be considered to have occurred regardless of whether there is an actual display of the AR element 60 when the peering it is only a part of the total virtual action that is to be accomplished. For example, one or more parts of the virtual action other than the peering may be accomplished although the target display device may be offline (e.g., accomplish virtual standing next to the offline target TV 42 following one or more attempts to peer). Accordingly, the virtual action may occur regardless of whether there is a display of the AR element 60, even though there may or may not be an actually display of the AR element 60.

Additionally, the actuation event may occur regardless of the display of the AR element 60. In one example, although the AR element 60 may be displayed on the smartphone 20, the tablet 18 and/or the TV 42 as it virtually walks about a virtual space (that may be mapped to the real space 10), the actuation events corresponding to the speaker 50, mini-blind 24, light fixture 30, speaker 52, and/or door 56 may occur regardless of the display of the AR element 60. In another example, the actuation event may include muting the sound of the TV 42 as the AR element 60 virtually walks in the virtual space in a virtual location corresponding to the front of the TV 42 without rendering an image of the AR element 60, the actuation event may include lighting the light 32 and the light 38 in sequence without rendering video of the AR element 60 by the TV 42, and so on, or combinations thereof. The actuation event may provide an indication to the user of the location of the AR element 60, for example where there is no display of the AR element 60 during a virtual walk. Accordingly, one or more of the actuation events may occur regardless of whether the AR element 60 is displayed.

Additionally, the display of the AR element 60 may occur independently of a secondary display of the AR element 60. In one example, where the actuation event may include a display of the AR element 60, the display may occur directly on a primary display device (e.g., the TV 42) independent of an intermediate (e.g., intervening second) display device. For example, the display of the AR element 60 may occur absent the need of the tablet 18 to view the interaction between the AR element 60 and the TV 42. In another example, the virtual action may include peering into a target display device (e.g., the TV 42), running to the display device, running out of the display device, running past the display device, and so on, or combinations thereof, wherein the display of the AR element 60 may occur independently of a secondary display of the AR element 60 and/or the need of a secondary display device.

Additionally, the display of the AR element 60 may occur independently of a secondary display that shows the real space 10 (and/or AR rendering thereof). For example, the display of the AR element 60 on a primary display device (e.g., the TV 42) may occur without requiring a secondary display device (e.g., the tablet 18) that is to show the real space 10. In addition, a display of the real space 10 (and/or the AR rendering thereof) by the primary display device itself may not be necessarily required, such as when the virtual action includes that the AR element 60 is to peer into the TV 42. Also, at least a portion of the real space 10 (and/or an AR rendering thereof) may optionally be displayed in other circumstances, such as when the primary display device is a mobile platform (e.g., the tablet 18) and the user points it towards the corner of the real space 10 to observe the AR element 60 virtually sitting as described above in one non-limiting example. Thus, the mobility of the display device may be a factor in determining whether, where, and/or how the AR element is to be displayed. Moreover, the virtual action and/or the actuation event may occur regardless of whether the user is viewing, or is to view, the display of the AR element 60 although such a factor may be used in determining whether, where, and/or how the AR element is to be displayed.

Additionally, the virtual action and/or the actuation event may occur based on if there is to be a visual display of the AR element 60. In one example, the virtual action may only specify peering into a target display device (e.g., the TV 42) by the AR element 60, and therefore may only occur when there is to be a visual display of the AR element 60. In another example, the virtual action may only occur when a specific display device is on, only when there is to be an instruction to turn the specific display device on to display the AR element 60, only when there is to be an instruction to allow the display of the AR element 60 by the specific display device, and so on, or combinations thereof. In such circumstances, the AR element 60 may also virtually disappear after the virtual action and/or the associated actuation event is completed, since the only requirement may be the display of the AR element 60. In a further example, the actuation event may include switching the light 32 only when a specific display device is on.

Additionally, the virtual action and/or the actuation event may be based on if there is to be a visual display independently of a secondary display of the AR element 60, independently of a secondary display device, independently of a display of the real space 10 (and/or AR rendering thereof) and so on, or combinations thereof. The virtual action and/or the actuation event depending only on a visual display of the AR element 60 may also occur regardless of whether the user is viewing, or is to view, the display of the AR element 60. In addition, one or more parts of a virtual action and/or one or more actuation events may occur regardless of a visual display of the one or more elements, while one or more other parts of the virtual action and/or one or more other actuation events may require that there is be a visual display of one or more of the AR elements. For example, the AR element 60 may virtually walk and virtually sit while the speaker 50 actuates regardless of a visual display of the AR element 60, while the AR element 60 may virtually lay down only when that portion of the virtual action is to be displayed.

The coordinator module of the AR apparatus 12 may include and/or interact with a pair module, which may perform an association between the virtual action of the AR element and the actuation event by the networked devices. The appropriate control signal sent to the corresponding networked device may be determined using a pair module that is on or off platform relative to the AR apparatus 12, on or off site relative to the real space 10, and so on, or combinations thereof. The pair module may consider the predetermined criteria, the attributes of the AR element, the information stored on a database, and so on, or combinations thereof. For example, the pair module may consider how many networked devices are available to automatically associate a virtual action (e.g., bark) with the actuation event (e.g., actuate speakers) corresponding to the networked device (e.g., speaker 50).

In addition, the pair module may provide a user interface and/or a database to perform the association between the virtual action of the one or more elements and the actuation event by the one or more networked devices. For example, a user may designate the virtual action, the real object and/or the actuation event to be employed in the association. In one example, the user may designate the behavior of the AR element alone, or in combination with the availability and/or capability of the real object (e.g., behavior=walk, available real object=TV, actuation event=render video, render audio, etc.). The user may also select such input from storage, for example from a database of inputs, or may create a new input to be stored and employed.

The coordinator module of the AR apparatus 12 may include and/or interact with a context module, which may allow the virtual action of the AR element to be adapted based at least on context information. The appropriate control signal sent to the corresponding networked device may be determined using a context module that is on or off platform relative to the AR apparatus 12, on or off site relative to the real space 10, and so on, or combinations thereof. The context module of the AR apparatus 12 may consider the predetermined criteria, the attributes of the AR element, the information stored on a database, and so on, or combinations thereof. For example, the context module of the AR apparatus 12 may evaluate user location, AR element ownership, temporal factors, and so on, or combinations thereof. In one example, the location module of the AR apparatus 12 may determine the location of the user in the real space 10 via one or more sensors, such as an audio sensor (e.g., the speaker 50) and/or and image capture sensor (e.g., the front-facing camera 44), and the information may be forwarded to the context module for evaluation.

Such evaluations may be used to determine and/or apply context information, for example the proximity of the user to the AR element, how many users are in the real space 10, the age of the users in the real space 10, time of day, and so on, or combinations thereof. In one example, facial recognition processes may be employed using one or more image capture sensors (e.g., 2D camera) to determine what user is closest to the location of the AR element (e.g., who is playing with the AR element) and the context information corresponding to the recognition (e.g., adult versus child) may be utilized to adapt the behavior of the AR element according to that information. In another example, the context information may be used to cause the AR element to behave in a certain manner (and thereby affect the environment differently) if the owner of the AR element is an adult (e.g., parent) rather than a child (e.g., may be unruly if the disciplining user is not there). In a further example, the context information may be used to cause the AR element to be virtually located at a different virtual location corresponding to a part of the real space 10 if it is evening versus daytime, or if people are watching the TV 42 versus having dinner. For example, if it is evening and people are in the living room, the AR element 60 may virtually move to a kennel (not shown) near the TV 42 and begin making noises rendered by the speaker 46, 50 and/or 52 to represent that it is sleeping, barking during programming advertisements, and so on, or combinations thereof.

The coordinator module of the AR apparatus 12 may include and/or interact with an affiliation module, which may allow the virtual action of the AR element to be adapted based at least on group information. The appropriate control signal sent to the corresponding networked device may be determined using an affiliation module that is on or off platform relative to the AR apparatus 12, on or off site relative to the real space 10, and so on, or combinations thereof. The affiliation module of the AR apparatus 12 may consider the predetermined criteria, the attributes of the AR element, the information stored on a database, and so on, or combinations thereof. For example, the affiliation module of the AR apparatus 12 may evaluate the user's and/or the AR element's affiliation with one or more groups. The group information may be based on social media affiliations (e.g., Facebook®, Twitter®, etc.) (registered trademarks of Facebook and Twitter, respectively), professional affiliations (e.g., work organization, etc.), educational affiliation (e.g., school), neighborhood affiliations (e.g., community name, geo-location, etc.), familial affiliations (e.g., family members), sports affiliations (e.g., football team, baseball team, etc.), and so on, or combinations thereof.

Such evaluations may be used to determine and/or apply group information to adapt the AR element behavior across the social group. In one example, the group information may be used to cause the virtual actions of the AR elements (and therefore actuations by the networked devices) to be coordinated to broadcast information, such as public safety information, advertisement information, and so on, or combinations thereof. For example, every AR element in the group in the neighborhood may be caused to bark (and therefore for corresponding speakers to render audio of the bark) as a precursor to an emergency evacuation. Also, a coordinated virtual action across the neighborhood or home may be implemented as part of a game or neighborhood event. For example, all of the AR elements in a neighborhood may be coordinated to virtually hide in a similar place across the neighborhood (e.g., under living room tables) while user's attempt to find them. As the user in the real space 10 approaches the AR element 60, the speakers 52, 46 and 50 may progressively render louder breathing noises indicating that the user is walking closer to the AR element 60. In addition, the AR element 60 may be instructed to virtually move from the under the table 16 to behind the couch 14 when the user approaches. When the user locates the AR element 60, the game may be restarted and the AR element 60 may be instructed to hide again. In addition, the AR element 60 may be instructed to virtually run from one home to another, for example by allowing members of the group to decide the appropriate behavior of the AR element 60. Accordingly, AR element action may be developed and/or shared across members of a group using the affiliation module.

The coordinator module of the AR apparatus 12 may include and/or interact with a user command module, which may allow the virtual action of the AR element to be adapted based at least on a command from the user located in the real space to the AR element. The appropriate control signal sent to the corresponding networked device may be determined using a user command module that is on or off platform relative to the AR apparatus 12, on or off site relative to the real space 10, and so on, or combinations thereof. The user command module of the AR apparatus 12 may consider the predetermined criteria, the attributes of the AR element, the information stored on a database, and so on, or combinations thereof. For example, the user command module of the AR apparatus 12 may evaluate user location, AR element ownership, user authority, and so on, or combinations thereof. In one example, the location module of the AR apparatus 12 may determine the location of the user in the real space 10 via one or more sensors, such as an audio sensor (e.g., the speaker 50) and/or and image capture sensor (e.g., the front-facing camera 44), and the information may be forwarded to the user command module for evaluation.

Such evaluations may be used to determine and/or apply user command information, for example commands to operate the real objects in the real space, commands to execute a virtual action, and so on, or combinations thereof. In one example, the one or more audio capture sensors (e.g., speaker) may be used to determine what user is closest to the virtual location of the AR element and/or the command expressed by the user, and the user command information may be utilized to adapt the behavior of the AR element according to that command information. For example, where the command includes a "fetch" command for content (e.g., a newspaper), the command module may evaluate the command and generate information to adapt the behavior of the AR element to virtually fetch the newspaper and provide the results on the nearest display relative to the user. In another example, the user may express a command to the AR element to turn a real device on (e.g., desktop computer) that is in a power-saving mode. The user command module may receive the command, determine the authority of the user, and allow the behavior of the AR element to be adapted to virtually turn on the real device.

Figure 2:
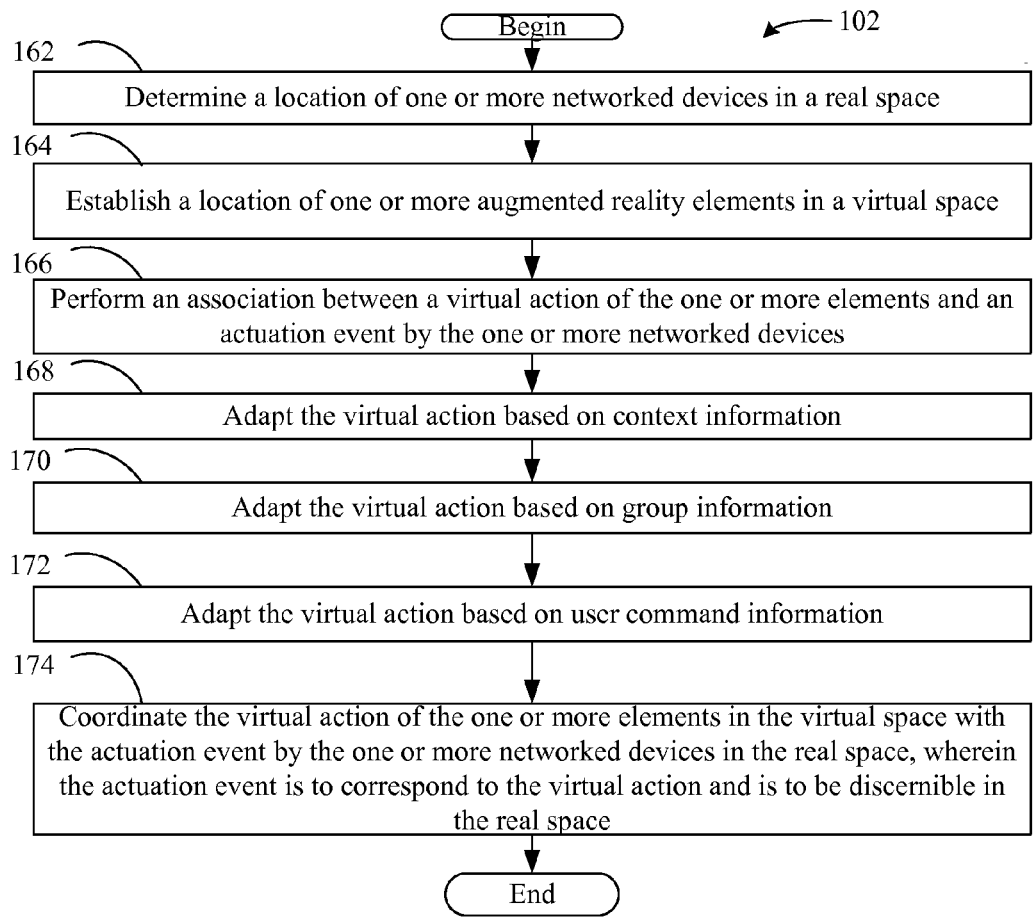
FIG. 2 is a block diagram of an example of a method to coordinate a virtual action of one or more augmented reality elements in a real space with an actuation event by one or more networked devices in the real space according to an embodiment.

Turning now to FIG. 2, a method 102 to coordinate a virtual action an AR element with an actuation event by networked devices in the real space is shown. The method 102 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 102 may be written in any combination of one or more programming languages, including an object oriented programming language such as C++ or the like and conventional procedural programming languages, such as the "C" programming language or similar programming languages. Moreover, the method 102 may be implemented using any of the herein mentioned circuit technologies.

Illustrated processing block 162 provides for determining a location of the networked devices in the real space. The real space may include a home, and the networked devices may be connected using any communications schema, including X-10, UPB, Z-Wave, ZigBee, Bluetooth, WiFi, and so on, or combinations thereof. The networked devices may include appliances, fixtures, consumer electronics, and so on, or combinations thereof. The location of the networked devices may be determined via actively reported location information generated by the networked devices, may be retrieved from the networked devices upon request, may be retrieved from storage (e.g., memory) upon request, may be determined using network mapping protocols, and so on, or combinations thereof. The location of all of the real objects in a real space may also be determined using a three-dimensional model of the real space, for example employing SLAM processes, whether or not the real objects are connected to the network.

Illustrated processing block 164 provides for establishing a location of the AR element in a virtual space. The virtual location of the AR element may be automatically assigned based on predetermined criteria, such as time of day, availability of devices in the real space, type of user in the real space, last known position, and so on, or combinations thereof. In addition, the virtual location of the AR element may depend on one or more attributes of the AR element, such as the manner of locomotion of the AR element, type of the AR element, age of the AR element, and so on, or combinations thereof. The user may also select a starting position for the AR element in real-time, and the virtual behavior (e.g., movement) of the AR element may be tracked based on the predetermined criteria, the attributes of the AR element, and so on, or combinations thereof. In addition, the location of the networked devices, the AR elements and/or the users in the real space may be stored in a database and/or map, retrieved from a database and/or map, and so on, or combinations thereof.

Illustrated processing block 166 provides for performing an association between the virtual action of the AR element and the actuation event by the networked devices. Various factors may be evaluated to perform the association, including considering the predetermined criteria, the attributes of the AR element, the information stored on a database, and so on, or combinations thereof. In addition, the user may designate the virtual action, the real object and/or the actuation event to be employed in the association. For example, the user may designate the action (e.g., behavior) of the AR element alone, or in combination with the availability and/or capabilities of the real networked objects in the real space, the environmental conditions (e.g., night, cold, etc.), and so on, or combinations thereof. The user may also select such input from storage, for example from a database of inputs, or may create a new input to be stored and employed.

Illustrated processing block 168 provides for adapting the virtual action of the AR element based at least on context information. Various factors may be evaluated to determine the context information, including considering the predetermined criteria, the attributes of the AR element, the information stored on a database, and so on, or combinations thereof. For example, user proximity, AR element ownership, and/or temporal factors may be evaluated to determine context information. Such evaluations may be used to determine proximity of an owner of the AR element, how many users there are in the real space, the age of the users in the real space, time of day, and so on, or combinations thereof, which in turn may be used to adapt the virtual action of the AR element based at least on the context information. In one example, the AR element may include a pet element (e.g., the AR element 60), the real space may include a living space (e.g., the real space 10), and the virtual action may include a virtual behavior based at least on the context information, wherein the context information may include one or more of a pet element owner (e.g., child, adult, etc.), an environmental condition (e.g., night time, cold, etc.), and proximity to the pet element (e.g., child is most proximate to the pet) in the real space.

Illustrated processing block 170 provides for adapting the virtual action of the AR element based at least on group information. Various factors may be evaluated to determine the group information, including considering the predetermined criteria, the attributes of the AR element, the information stored on a database, and so on, or combinations thereof. For example, a user's and/or an AR element's affiliation with one or more groups may be evaluated, which in turn may be used to adapt the virtual action of the AR element based at least on the context information. Such evaluations may be based on social media affiliations, professional affiliations, educational affiliation, neighborhood affiliations, familial affiliations, recreational affiliations, and so on, or combinations thereof. An evaluation may indicate that an owner, a real space, and/or an AR element may be part of a social group, and the affiliation information may be utilized to adapt the AR element behavior. In one example, the AR element may include a pet element (e.g., the AR element 60), the real space may include a living space (e.g., the real space 10), and the virtual action may include a virtual behavior based at least on the group information, wherein the group information may include one or more of social network group information (e.g., social media friends) and geographic group information (e.g., neighborhood geo-location information).

Illustrated processing block 172 provides for adapting the virtual action of the AR element based at least on user command information from a user located in the real space to the AR elements. Various factors may be evaluated to determine the user command information, including considering the predetermined criteria, the attributes of the AR element, the information stored on a database, and so on, or combinations thereof. For example, there may be an evaluation of user proximity to the AR element, AR element ownership, temporal factors, and so on, or combinations thereof, which in turn may be used to adapt the virtual action of the AR element based at least on the context information. Such evaluations may be used to determine whether the owner of the AR element is proximate to the AR element, how many users there are in the real space, the age of the users in the real space, and so on, or combinations thereof. In one example, the AR element may include a pet element (e.g., the AR element 60), the command may include a fetch command for content (e.g., audio command to "fetch" a newspaper), the virtual action may include a download action corresponding to the content, and the actuation event may include an observable actuation event by the user in the real space (e.g., the real space 10), wherein the content may be automatically displayed using the networked device that is most proximate to the user (e.g., the tablet 18 when the user is on the couch 14).

Illustrated processing block 174 provides for coordinating a virtual action of the AR element in the real space with an actuation event by the networked devices. In the illustrated example, the actuation event may correspond to the virtual action in a real space and be discernible in the real space. Additionally, the virtual action and/or the actuation event may occur regardless of a display of the one or more elements. In addition, the virtual action and/or the actuation event may occur based on if there is to be a visual display of the AR element. Moreover, one or more parts of a virtual action and/or one or more actuation events may occur regardless of the display of AR element, while one or more other parts of the virtual action and/or one or more other actuation events may require that there is be the visual display of AR element.

In addition, the actuation event may include a sensory output by the one or more networked devices in the real space independently of an intermediate display device. In one example, the sensory output may include a tactile, auditory, visual and/or olfactory actuation event by the one or more networked devices. The tactile actuation event may include blinds moving (e.g., the mini-blind 24) or a door swinging (e.g., the door 56). The auditory actuation event may include a sound from a speaker representative of the AR element type (e.g., bark for an AR dog). The visual actuation event may include a download event (e.g., download of requested information) or a display of the AR element (e.g., an image, a video, and/or projection, etc.). The olfactory actuation may include spraying of fragrance from controllable dispensers, modulation of an HVAC assembly, and so on, or combinations thereof.

In addition, various factors may be evaluated to coordinate the virtual action of the AR element in the virtual space with the actuation event by the networked devices in the real space, such as the location information, the association information, the context information, the group information, the user command information, and so on, or combinations thereof. Additionally, the virtual action may include virtual movement of the AR element in a virtual space (that may be mapped to the real space) and the actuation event may include a sensory output by the networked devices in the real space independently of an intermediate display device. For example, the element may include a pet element (e.g., AR element 60), the real space may include a living space (e.g., real space 10), the virtual action may include a change in the virtual location via a virtual walk within the virtual space, and the actuation event may include an observable actuation event by the user in the living space independently of the display device (e.g., lighting of the fixture 30 independently of any display device in the real space 10). In another example, the actuation event may include an observable actuation event by the user in the living space independently of an intermediate display device (e.g., display on the TV 42 independently of any intermediate display device in the real space 10).

The data used to determine the location of the networked device, the location of the object, the location of the AR element, the location of the user, the association information, the context information, the affiliation information, and/or the user command information to coordinate the virtual action of the AR element may be generated by a variety of sources, including a motion sensor, an audio sensor, an image sensor, an environmental sensor, and so on, or combinations thereof. The motion sensor may be employed to capture the acceleration of a device, a rotation of a device, the acceleration of a user, the rotation of a user, and so on, or combinations thereof. The motion sensor may also provide positioning information (e.g., GPS or other indoor positioning techniques), for example to determine location information of the networked device. The audio sensor may be used to capture any sound (e.g., in the audible or non-audible frequency range), speech, or recognize real objects and/or users in the real space, for example to determine location information (e.g., discrete in terms of points of interest (POIs) or typical continuous), context information (e.g., about the device, the user or the environment), and so on, or combinations thereof. In addition, the image capture sensor may be used to determine location information corresponding to the networked devices, the AR elements, and/or the users in the real space, context information, and so on, or combinations thereof.

The environmental sensor may be used to determine context information, such as time of day, weather, and so on, or combinations thereof. The environmental sensor may utilize input from a remote sensor, for example a climate sensor that is located outdoors, to provide precipitation, temperature, pressure, elevation, humidity, time of day, sunshine, and so on, or combinations thereof. The sensor may also include a soft sensor, for example a soft sensor from an Internet service to process a measurement (e.g., weather measurements). The soft sensor may also provide information related to a predetermined area, such as a zip code for example to provide context information (e.g., time or day) or affiliation information (e.g., neighborhood information).

Figure 3:
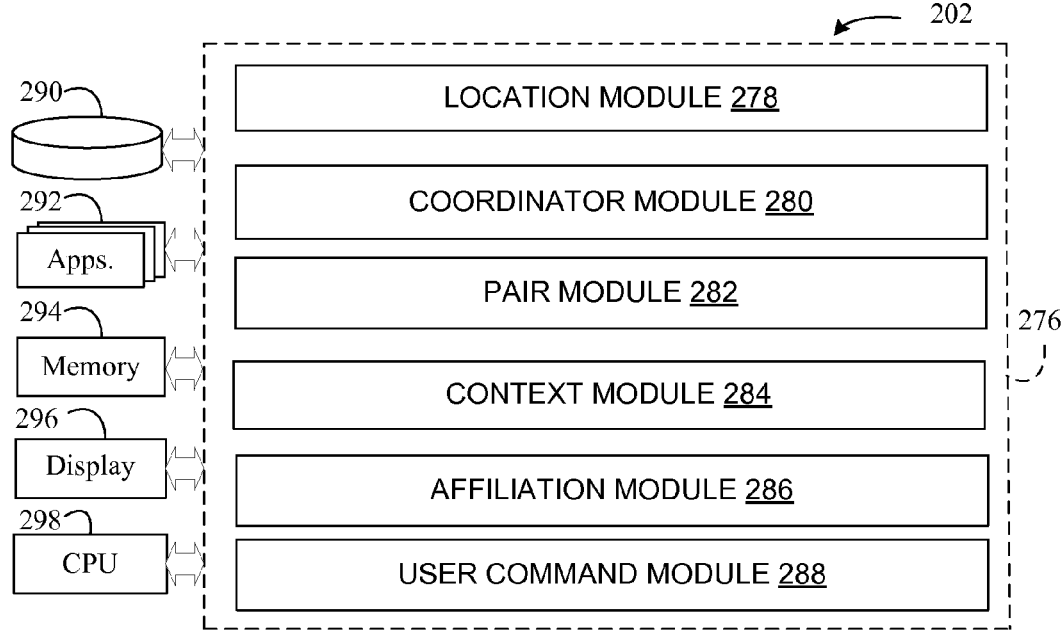
FIG. 3 is a block diagram of an example of a logic architecture according to an embodiment.

FIG. 3 shows an apparatus 202 including logic architecture 276 to coordinate a virtual action of an AR element in a real space with an actuation event by networked devices in the real space. The logic architecture 276 may be generally incorporated into a platform such as such as a laptop, personal digital assistant (PDA), wireless smart phone, media player, imaging device, mobile Internet device (MID), any smart device such as a smart phone, smart tablet, smart TV, computer server, and so on, or combinations thereof. The logic architecture 276 may be implemented in an application, operating system, media framework, hardware component, or combinations thereof. The logic architecture 276 may be implemented in any component of an AR pipeline, such as a network interface component, memory, processor, hard drive, operating system, application, and so on, or combinations thereof. For example, the logic architecture 276 may be implemented using a processor, such as a central processing unit (CPU), a graphical processing unit (GPU), a visual processing unit (VPU), a sensor, an operating system, an application, and so on, or combinations thereof. The apparatus 202 may include and/or interact with storage 290, applications 292, memory 294, display 296, CPU 298, and so on, or combinations thereof.

In the illustrated example, the logic architecture 276 may include a location module 278. The location module 278 may determine a location of one or more networked devices, of one or more objects, of one or more AR elements, and/or of one or more users. In addition, the logic architecture 276 may include a coordinator module 280. The illustrated coordinator module 280 may coordinate the virtual action of the AR elements with an actuation event by the networked devices in the real space. In the illustrated example, the actuation event may correspond to the virtual action in a virtual space and be discernible in the real space. Additionally, the virtual action and/or the actuation event may occur regardless of a display of the AR element. In addition, the virtual action and/or the actuation event may occur based on if there is to be a visual display of the AR element. Moreover, one or more parts of a virtual action and/or one or more actuation events may occur regardless of the display of AR element, while one or more other parts of the virtual action and/or one or more other actuation events may require that there is be the visual display of AR element. The virtual action and/or the actuation event may occur independently of an intermediate display device, a rendering of the real space, and/or regardless of whether a user is to view, or is viewing, the AR element.

Additionally, the illustrated logic architecture 276 may include a pair module 282, which may perform an association between the virtual action of the AR element and the actuation event by the networked devices. Also, the logic architecture 276 may include a context module 284, which may adapt the virtual action of the AR element based at least on context information. In addition, the logic architecture 276 may include a user command module 288, which may adapt the virtual action of the AR element based at least on group information. The logic architecture 276 may also include a communication module (not shown). The communication module may be connected, and/or integrated, with a network interface component (e.g., Network Interface Card (NIC) (not shown). The communication module may synchronously and bi-directionally communicate data, such as an AR element behavior, a control signal, location information, context information, group information, user command information, and so on, or combinations thereof. In addition, the communication module may synchronously and bi-directionally communicate data with a remote system, the storage 290, the applications 292, the memory 294, the display 296, the CPU 298, sensors (not shown), operating systems (not shown) so on, or combinations thereof.

While examples have illustrated separate modules for illustration purposes, it is should be understood that one or more of the modules of the logic architecture 276 may be implemented in one or more combined modules, such as a single module including one or more of the location module 278, the coordinator module 280, the pair module 282, the context module 284, the affiliation module 286, the user command module 288, the communication module (not shown), and so on. In addition, it should be understood that one or more logic components of the apparatus 202 may be on platform, off platform, and/or reside in the same or different real space as the apparatus 202. For example, the coordinator module 280 may reside in a computing cloud environment on a server while one or more of the location module 278, the pair module 282, the context module 284, the affiliation module 286 and the user command module 288 may reside in the real space where the AR element is to be located, and vice versa, or combinations thereof.

Figure 4:
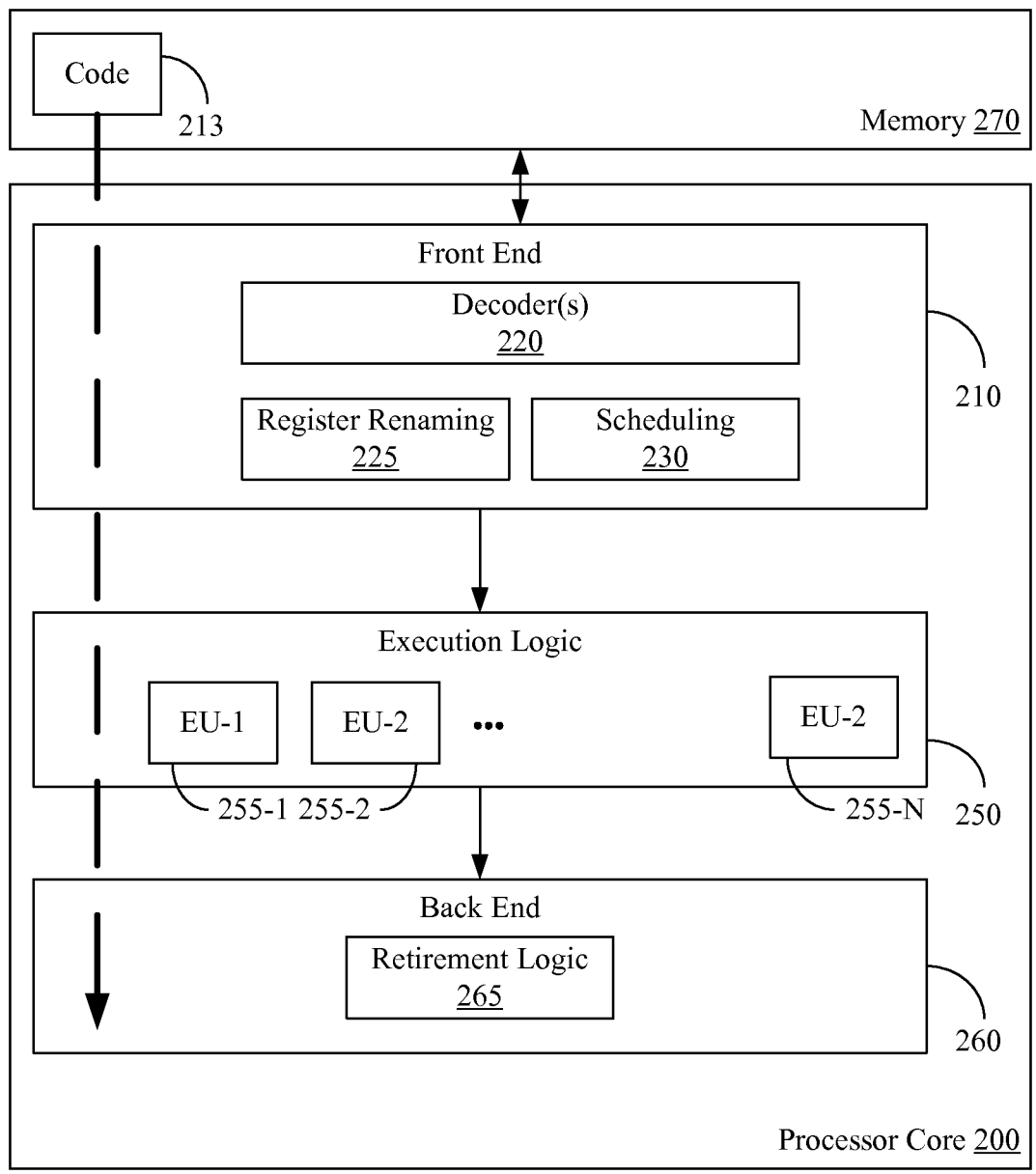
FIG. 4 is a block diagram of an example of a processor according to an embodiment.

Turning now to FIG. 4, a processor core 200 according to one embodiment is shown. The processor core 200 may be the core for any type of processor, such as a micro-processor, an embedded processor, a digital signal processor (DSP), a network processor, or other device to execute code to implement the technologies described herein. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 276 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that may perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
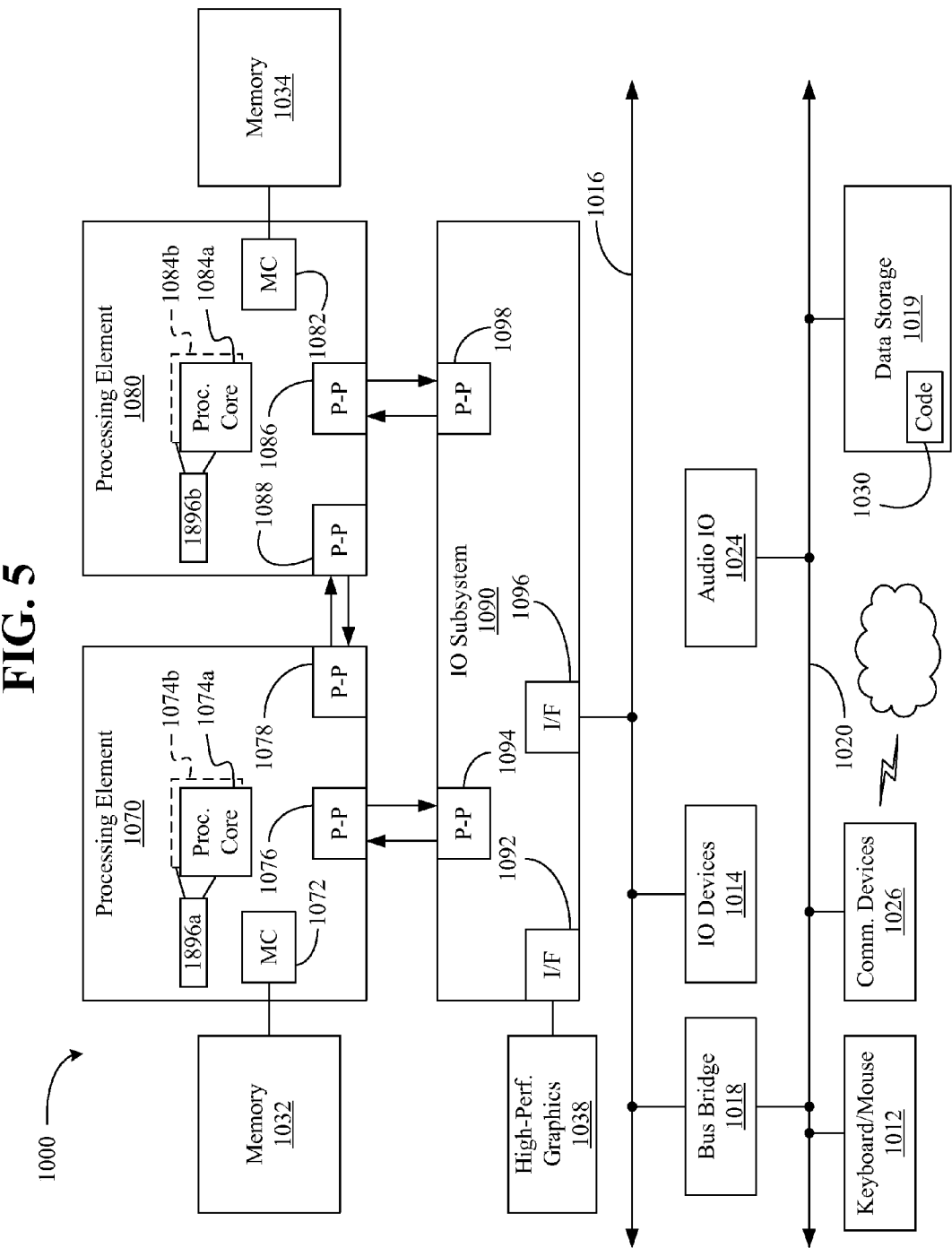
FIG. 5 is a block diagram of an example of a system according to an embodiment.

FIG. 5 shows a block diagram of a system 1000 in accordance with an embodiment. Shown in FIG. 5 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 4.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There may be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope is not so limited.

As shown in FIG. 5, various I/O devices 1014 such as the display 296 (FIG. 3) may be coupled to the first bus 1016, along with a bus bridge 1018 which may couple the first bus 1016 to a second bus 1010. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the logic architecture 276 (FIG. 3), already discussed. Further, an audio I/O 1024 may be coupled to second bus 1020.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

Additional Notes And Examples:

Examples may include subject matter such as an apparatus to perform a method of managing environment actuation by an augmented reality element, means for performing acts, or a machine readable medium including instructions that when performed by a machine causes the machine to perform acts related to environment actuation by the augmented reality element.

Example 1 may include subject matter such as an apparatus to perform a method of managing environment actuation by an augmented reality element. The apparatus may include a network interface, a location module to determine via information received at the network interface a location of one or more networked devices in a real space and/or to establish a location of one or more augmented reality elements in a virtual space (that may be mapped to the real space), and/or a coordinator module to coordinate a virtual action of the one or more elements in the virtual space with an actuation event by the one or more networked devices in the real space. Moreover, the actuation event may correspond to the virtual action in a virtual space and be discernible in the real space.

The virtual action and/or the actuation event may occur regardless of a display of the one or more elements. The virtual action and/or the actuation event may occur based on if there is to be a visual display of the AR element. One or more parts of a virtual action and/or one or more actuation events may occur regardless of the display of AR element, while one or more other parts of the virtual action and/or one or more other actuation events may require that there is be the visual display of AR element.

Example 2 includes the subject matter of Example 1 and further optionally is to enable the location module to generate a three-dimensional model of the real space.

Example 3 includes the subject matter of any of Example 1 to Example 2 and further optionally is to enable the location determined by the location module to correspond to an appliance and/or a fixture.

Example 4 includes the subject matter of any of Example 1 to Example 3 and further optionally is to enable the actuation event to include a sensory output by the one or more networked devices in the real space independently of an intermediate display device. The sensory output may optionally include a tactile, auditory, virtual and/or olfactory actuation event.

Example 5 includes the subject matter of any of Example 1 to Example 4 and further optionally is to include a plurality of communicatively connected networked devices in the real space.

Example 6 includes the subject matter of any of Example 1 to Example 5 and further optionally is to enable the location module and/or the coordinator module reside in the real space.

Example 7 includes the subject matter of any of Example 1 to Example 6 and further optionally is to include a pair module to perform an association between the virtual action of the one or more elements and the actuation event by the one or more networked devices. The pair module may further optionally provide one or more of a user interface and a database to perform the association between the virtual action of the one or more elements and the actuation event by the one or more networked devices.

Example 8 includes the subject matter of any of Example 1 to Example 7 and further optionally is to include a context module to allow the virtual action of the one or more elements to be adapted based at least on context information.

Example 9 includes the subject matter of any of Example 1 to Example 8 and further optionally is to include an affiliation module to allow the virtual action of the one or more elements to be adapted based at least on group information.

Example 10 includes the subject matter of any of Example 1 to Example 9 and further optionally is to include a user command module to allow the virtual action of the one or more elements to be adapted based at least on a command from a user located in the real space to the one or more elements.

Example 11 includes the subject matter of any of Example 1 to Example 10 and further optionally is to enable the location module to determine the networked device location and/or the context information from a motion sensor, an audio sensor, an image sensor, and/or an environmental sensor.

Example 12 may include subject matter such as a method of managing environment actuation by an augmented reality element. The method may include determining a location of one or more networked devices, establishing a location of one or more augmented reality elements in a virtual space (which may be mapped to a real space), and/or coordinating a virtual action of the one or more elements in the virtual space with an actuation event by the one or more networked devices in the real space. Moreover, the actuation event may correspond to the virtual action in the virtual space and be discernible in the real space.

The virtual action and/or the actuation event may occur regardless of a display of the one or more elements. The virtual action and/or the actuation event may occur based on if there is to be a visual display of the AR element. One or more parts of a virtual action and/or one or more actuation events may occur regardless of the display of AR element, while one or more other parts of the virtual action and/or one or more other actuation events may require that there is be the visual display of AR element.

Example 13 includes the subject matter of Example 12 and further optionally includes generating a three-dimensional model of the real space.

Example 14 includes the subject matter of any of Example 12 to Example 13 and further optionally includes determining the location of an appliance and/or a fixture.

Example 15 includes the subject matter of any of Example 12 to Example 14 and further optionally includes coordinating the virtual action of the one or more elements with a sensory output by the one or more networked devices. The sensory output may optionally include a tactile, auditory, visual and/or olfactory actuation event by the one or more networked devices.

Example 16 includes the subject matter of any of Example 12 to Example 15 and further optionally includes coordinating an action that is to include a change in the virtual location of the one or more elements within a virtual space with an actuation event that is to include a sensory output by the one or more networked devices in the real space independently of a display device.

Example 17 includes the subject matter of any of Example 12 to Example 16 and further optionally includes enabling the element to include a pet element, the real space to include a living space, the virtual action to include a change in the virtual location via a virtual walk within a virtual space, and the actuation event to include an observable actuation event by a user in the living space independently of the display device.

Example 18 includes the subject matter of any of Example 12 to Example 17 and further optionally includes adapting the virtual action of the one or more elements based at least on context information.

Example 19 includes the subject matter of any of Example 12 to Example 18 and further optionally includes enabling the element to include a pet element, the real space to include a living space, and the virtual action to include a virtual behavior based at least on the context information, wherein the context information is to include one or more of a pet element owner, an environmental condition, and proximity to the pet element in the real space.

Example 20 includes the subject matter of any of Example 12 to Example 19 and further optionally includes adapting the virtual action of the one or more elements based at least on group information.

Example 21 includes the subject matter of any of Example 12 to Example 20 and further optionally includes enabling the element to include a pet element, the real space to include a living space, and the virtual action to be a virtual behavior based at least on the group information, wherein the group information is to include one or more of social network group information and geographic group information.

Example 22 includes the subject matter of any of Example 12 to Example 21 and further optionally includes adapting the virtual action of the one or more elements based at least on a command from a user located in the real space to the one or more elements.

Example 23 includes the subject matter of any of Example 12 to Example 22 and further optionally includes enabling the element to include a pet element, the command to include a fetch command for content, the virtual action to include a download action corresponding to the content, and the actuation event to include an observable actuation event by the user in the real space, wherein the content is to be automatically displayed using a networked device that is most proximate to the user.

Example 24 includes the subject matter of any of Example 12 to Example 23 and further optionally enables the actuation event to include a sensory output by the one or more networked devices in the real space independently of an intermediate display device.

Example 25 includes the subject matter of any of Example 12 to Example 24 and further optionally includes performing an association between the virtual action of the one or more elements and the actuation event by the one or more networked devices.

Example 26 may include subject matter such as at least one computer-readable medium including one or more instructions that when executed on one or more processors causes the one or more processors to perform the method of any of Example 12 to Example 25.

Example 27 may include subject matter such as at least one computer-readable medium including one or more instructions that when executed on one or more computing devices causes the one or more computing devices to perform the method of any of Example 12 to Example 25.

Example 28 may include subject matter such as at least one apparatus including means for performing the method of any of Example 12 to Example 25.

Example 29 may include subject matter such as at least one system including means for performing the method of any of Example 12 to Example 25.

Example 30, may include subject matter of any of Example 1 to Example 29, and further optionally enables the virtual action and/or the actuation event to occur independently of a display of the real space (and/or AR representation thereof).

Example 31 may include subject matter of any of Example 1 to Example 30, and further optionally enables the virtual action and/or the actuation event to occur regardless of whether the user is viewing, or is to view, the display of the one or more elements.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carry the meaning of "one or more" or "at least one". In addition, as used in this application and in the claims, a list of items joined by the term "one or more of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
a network interface;
a location module to determine via information received at the network interface a location of one or more networked devices in a real space and to establish a location of one or more augmented reality elements in a virtual space that is to be mapped to the real space;
a coordinator module to coordinate a virtual action of the one or more elements in the virtual space with an actuation event by the one or more networked devices in the real space, wherein the actuation event is to correspond to the virtual action in the virtual space and be discernible in the real space, wherein the virtual action to include a download action corresponding to content, and wherein the content is to be automatically displayed using a networked device that is most proximate to a user located in the real space.

2. The apparatus of claim 1, wherein the virtual action of the one or more elements is to be displayed.

3. The apparatus of claim 1, further comprising:
a pair module to perform an association between the virtual action of the one or more elements and the actuation event by the one or more networked devices;
a context module to allow the virtual action of the one or more elements to be adapted based at least on context information; or
a user command module to allow the virtual action of the one or more elements to be adapted based at least on a command from a user located in the real space to the one or more elements.

4. The apparatus of claim 3, wherein the pair module is to provide a user interface or a database to perform the association between the virtual action of the one or more elements and the actuation event by the one or more networked devices.

5. The apparatus of claim 3, wherein the location module is to determine a networked device location, a real object location, a user location, or the context information from a motion sensor, an audio sensor, an image sensor, or an environmental sensor.

6. The apparatus of claim 1, wherein the actuation event is to include a visual display of the one or more elements by the one or more networked devices in the real space independently of an intermediate display device.

7. The apparatus of claim 1, wherein the location module is to generate a three-dimensional model of the real space or wherein the location determined by the location module is to correspond to an appliance or a fixture.

8. The apparatus of claim 1, wherein the virtual action or the actuation event is to occur regardless of a display of the one or more elements.

9. The apparatus of claim 1, further comprising an affiliation module to allow the virtual action of the one or more elements to be adapted based at least on group information, wherein the virtual action is to be a virtual behavior based at least on the group information, and wherein the group information is to include one or more of social network group information and geographic group information.

10. At least one non-transitory computer-readable medium comprising one or more instructions that when executed on a computing device cause the computing device to:
coordinate a virtual action of one or more elements in a virtual space that is to be mapped to a real space with an actuation event by one or more networked devices in the real space, wherein the actuation event is to correspond to the virtual action and be discernible in the real space, wherein the virtual action to include a download action corresponding to content, and wherein the content is to be automatically displayed using a networked device that is most proximate to a user located in the real space.

11. The at least one non-transitory medium of claim 10, wherein when executed the one or more instructions cause the computing device to generate a three-dimensional model of the real space or to determine the location of one or more of an appliance and a fixture.

12. The at least one non-transitory medium of claim 10, wherein when executed the one or more instructions cause the computing device to coordinate the virtual action of the one or more elements with a tactile, auditory, visual or olfactory actuation event by the one or more networked devices.

13. The at least one non-transitory medium of claim 10, wherein when executed the one or more instructions cause the computing device to coordinate an action that is to include a change in a virtual location of the one or more elements within the virtual space with an actuation event that is to include a sensory output by the one or more networked devices in the real space independently of a display device.

14. The at least one non-transitory medium of claim 13, wherein when executed the one or more instructions cause the computing device to enable the one or more elements to include a pet element, the real space to include a living space, the virtual action to include a change in the virtual location via a virtual walk within the virtual space, and the actuation event to include an observable actuation event by a user in the living space independently of the display device.

15. The at least one non-transitory medium of claim 10, wherein when executed the one or more instructions cause the computing device to adapt the virtual action of the one or more elements based at least on context information.

16. The at least one non-transitory medium of claim 15, wherein when executed the one or more instructions cause the computing device to enable the one or more elements to include a pet element, the real space to include a living space, and the virtual action to include a virtual behavior based at least on the context information, wherein the context information is to include one or more of a pet element owner, an environmental condition, and proximity to the pet element in the real space.

17. The at least one non-transitory medium of claim 10, wherein when executed the one or more instructions cause the computing device to adapt the virtual action of the one or more elements based at least on a command from the user located in the real space to the one or more elements.

18. The at least one non-transitory medium of claim 17, wherein when executed the one or more instructions cause the computing device to enable the one or more elements to include a pet element, the command to include a fetch command for the content, and the actuation event to include an observable actuation event by the user in the real space.

19. The at least one non-transitory medium of claim 10, wherein when executed the one or more instructions cause the computing device to perform an association between the virtual action of the one or more elements and the actuation event by the one or more networked devices.

20. The at least one non-transitory medium of claim 10, wherein when executed the one or more instructions cause the computing device to determine a location of one or more networked devices in the real space or to establish a location of one or more augmented reality elements in the virtual space.

21. The at least one medium of claim 10, wherein when executed the one or more instructions cause the computing device to enable the virtual action or the actuation event to occur regardless of a display of the one or more elements.

22. The at least one non-transitory medium of claim 10, wherein when executed the one or more instructions cause the computing device to adapt the virtual action of the one or more elements based at least on group information, wherein the virtual action is to be a virtual behavior based at least on the group information, and wherein the group information is to include one or more of social network group information and geographic group information.

23. A method comprising:
coordinating a virtual action of one or more elements in a virtual space that is mapped to a real space with an actuation event by one or more networked devices in the real space, wherein the actuation event corresponds to the virtual action and is discernible in the real space, wherein the virtual action includes a download action corresponding to content, and wherein the content is automatically displayed using a networked device that is most proximate to a user located in the real space.

24. The method of claim 23, further comprising:
determining a location of one or more networked devices in the real space;
establishing a location of one or more augmented reality elements in the virtual space;
performing an association between the virtual action of the one or more elements and the actuation event by the one or more networked devices; or
adapting the virtual action of the one or more elements based at least on context information or user command information.

25. The method of claim 23, wherein the virtual action or the actuation event occurs regardless of a display of the one or more elements.

26. The method of claim 23, further comprising adapting the virtual action of the one or more elements based at least on group information, wherein the virtual action is a virtual behavior based at least on the group information, and wherein the group information includes one or more of social network group information and geographic group information.

27. At least one non-transitory computer-readable medium comprising one or more instructions that when executed on a computing device cause the computing device to:

coordinate a virtual action of one or more elements in a virtual space that is to be mapped to a real space with an actuation event by one or more networked devices in the real space, wherein the actuation event is to correspond to the virtual action and be discernible in the real space; and
adapt the virtual action of the one or more elements based at least on a command from a user located in the real space to the one or more elements, wherein the one or more elements are to include a pet element, the command is to include a fetch command for content, the virtual action is to include a download action corresponding to the content, and the actuation event is to include an observable actuation event by the user in the real space, and wherein the content is to be automatically displayed using a networked device that is most proximate to the user.

28. A method comprising:
coordinating a virtual action of one or more elements in a virtual space that is mapped to a real space with an actuation event by one or more networked devices in the real space, wherein the actuation event corresponds to the virtual action and is discernible in the real space; and
adapting the virtual action of the one or more elements based at least on a command from a user located in the real space to the one or more elements, wherein the one or more elements include a pet element, the command includes a fetch command for content, the virtual action includes a download action corresponding to the content, and the actuation event includes an observable actuation event by the user in the real space, and wherein the content is automatically displayed using a networked device that is most proximate to the user.

29. An apparatus comprising:
a network interface;
a location module to determine via information received at the network interface a location of one or more networked devices in a real space and to establish a location of one or more augmented reality elements in a virtual space that is to be mapped to the real space;
a coordinator module to coordinate a virtual action of the one or more elements in the virtual space with an actuation event by the one or more networked devices in the real space, wherein the actuation event is to correspond to the virtual action in the virtual space and be discernible in the real space; and
a user command module to allow the virtual action of the one or more elements to be adapted based at least on a command from a user located in the real space to the one or more elements, wherein the one or more elements are to include a pet element, the command is to include a fetch command for content, the virtual action is to include a download action corresponding to the content, and the actuation event is to include an observable actuation event by the user in the real space, and wherein the content is to be automatically displayed using a networked device that is most proximate to the user.

* * * * *